(12) United States Patent
Wallbaum (10) Patent No.: US 11,593,076 B2
(45) Date of Patent: Feb. 28, 2023

(54) METHOD FOR MERGING ARCHITECTURE DATA

(71) Applicant: dSPACE digital signal processing and control engineering GmbH, Paderborn (DE)

(72) Inventor: Lars Wallbaum, Paderborn (DE)

(73) Assignee: DSPACE GMBH, Paderborn (DE)

( * ) Notice: Subject to any disclaimer, the term of this patent is extended or adjusted under 35 U.S.C. 154(b) by 0 days.

(21) Appl. No.: 17/356,562

(22) Filed: Jun. 24, 2021

(65) Prior Publication Data
US 2022/0019414 A1 Jan. 20, 2022

(30) Foreign Application Priority Data
Jun. 26, 2020 (DE) .......................... 102020116862.4

(51) Int. Cl.
*G06F 8/41* (2018.01)
(52) U.S. Cl.
CPC ...................... *G06F 8/41* (2013.01)
(58) Field of Classification Search
CPC .............. G06F 8/40; G06F 8/41; G06F 8/443
See application file for complete search history.

(56) References Cited

U.S. PATENT DOCUMENTS

| 7,010,580 B1* | 3/2006 | Fu ....................... G06F 21/6218 709/217 |
| 2009/0070735 A1* | 3/2009 | Son .......................... G06F 8/10 717/104 |
| 2013/0073063 A1* | 3/2013 | Kiffmeier .......... G05B 19/0426 700/86 |

FOREIGN PATENT DOCUMENTS

WO WO-2014155148 A1 * 10/2014 ............... G06F 8/51

\* cited by examiner

*Primary Examiner* — Hanh Thi-Minh Bui
(74) *Attorney, Agent, or Firm* — Leydig, Voit & Mayer, Ltd.

(57) ABSTRACT

A computer-implemented method for merging architecture data that are exchanged between an architecture definition tool and a behavior modeling tool includes: opening a first file with first architecture data and a second file with second architecture data in a comparison tool; comparing the first architecture data with the second architecture data to obtain a first list of differences; retrieving at least one combination rule, wherein the at least one combination rule comprises an identification rule for identifying a difference and a change to be applied to the identified difference; ascertaining a second list of differences that fulfill the identification rule and removing the differences of the second list from the first list; and applying the change defined in the at least one combination rule to each difference in the second list.

9 Claims, 5 Drawing Sheets

METHOD FOR MERGING ARCHITECTURE DATA

FIELD

The invention relates to the merging of architecture data that is exchanged between an architecture definition tool and a behavior modeling tool.

BACKGROUND

Control devices are used in a variety of applications to record physical quantities of a process and/or to act on a process via connected actuators; for example, they can be an anti-blocking control of a braking process. The time constants that determine the dynamic behavior of the process often cause cycle times of 1 ms or shorter, so that the control device must be real-time-capable. In order to accelerate the design of control devices, control strategies are frequently developed on the basis of models in a computing environment, such as MATLAB/Simulink. The process and/or controller or, in general, the behavior of the control device may thus be simulated first, and the presence of desired properties may be checked. In particular, the models can be block diagrams that comprise blocks that perform operations, such as calculations, wherein a block can calculate an output signal from multiple input signals, for example.

Source code for programming the control device can be generated directly from the models via a code generator. For example, a code generator for generating production quality source code is known from the document entitled "Production Quality Code Generation from Simulink Block Diagrams", Proceedings of the 1999 International Symposium on Computer Aided Control System Design, Kohala Coast, Hi., by H. Hanselmann et al. In this case, the generated production code can be adapted by an additional annotation of the blocks or block variables, in order to, for example, set the compliance with code standards or the use of fixed-point calculations. In particular, a combination of computing environment and code generator can be used as a behavior modeling tool.

Increasing the memory resources and the computing speed of modern microcontrollers enables increasingly more complex control strategies along with the execution of multiple programs on a single control device. In order to overcome this increased complexity, the AUTOSAR (AUTomotive Open System ARchitecture) development partnership has defined a software framework for developing ECU software (detailed information can be found at www.autosar.org). Before implementing the actual control strategy or the desired behavior, an architecture of the software is defined. The architecture comprises software components, subcomponents (runnable entities) and interfaces of software components. Messaging between various software components can take place via a runtime environment (RTE) that is adapted to the defined architecture. For example, the software architecture can correspond to the AUTOSAR Classic Platform standard version 4.3.0 of Nov. 30, 2016. SystemDesk by dSPACE can be used as the architecture definition tool.

In the case of workflow for generating a software component for a control device, the architecture definition tool and the behavior modeling tool must exchange data. This generally takes place with the aid of dedicated XML files. These files correspond, for example, to a formal exchange format defined by the AUTOSAR consortium (ARXML files). When the architecture has been defined, at least one ARXML file is generated and imported into the behavior modeling tool. Based on the data imported, the behavior modeling tool can generate a model framework. As soon as the desired control strategy has been modeled, the source code for the software component can be generated by the behavior modeling tool. Since portions of the data resulting from a code generation are also relevant to the architecture definition tool, the behavior modeling tool is also adapted for exporting ARXML files. During the development process, a round trip of ARXML files can take place multiple times between the architecture definition tool and the behavior modeling tool (and vice versa).

Problems during exchange can occur, for example, by the behavior modeling tool requiring and understanding only one portion of the architecture data, while other portions of the architecture data are generated and evaluated by the architecture definition tool. If the behavior modeling tool deletes or changes these other portions, this can have undesirable effects in the architecture definition tool.

Existing comparison programs for texts, which are arranged in lines with a plurality of words in each case, can only be applied to ARXML files with a more complex structure to a limited extent.

SUMMARY

In an exemplary embodiment, the present invention provides a computer-implemented method for merging architecture data that are exchanged between an architecture definition tool and a behavior modeling tool. The architecture definition tool is configured to define an architecture of a software component. The architecture data comprises objects. The behavior modeling tool is configured to generate source code for at least one subcomponent of the software component based on a functional model, wherein the functional model comprises multiple interconnected blocks. The architecture definition tool and the behavior modeling tool are each configured to import and/or export architecture data. The method includes: opening a first file with first architecture data and a second file with second architecture data in a comparison tool; comparing the first architecture data with the second architecture data to obtain a first list of differences; retrieving at least one combination rule, wherein the at least one combination rule comprises an identification rule for identifying a difference and a change to be applied to the identified difference; ascertaining a second list of differences that fulfill the identification rule and removing the differences of the second list from the first list; and applying the change defined in the at least one combination rule to each difference in the second list.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention offer a flexible possibility of merging relevant changes from two ARXML files.

In an exemplary embodiment, the present invention provides a method for merging architecture data, which are exchanged between an architecture definition tool and a behavior modeling tool.

A method according to the invention can be carried out, for example, by at least one processor in a computer system, wherein the software on the computer system comprises an architecture definition tool and a behavior modeling tool. The architecture definition tool can be configured to define an architecture of the software component, wherein architecture data includes a declaration of one or more subcomponents and of one or more interfaces, and to export and import architecture data. The behavior modeling tool can be configured to generate source code for the software component based on a functional model comprising multiple interconnected blocks, to import and export architecture data, and/or to create a model framework for the functional model based on the architecture data, or to update the model framework if new or changed architecture data are received by the architecture definition tool.

The exchange of architecture data between the architecture definition tool and the behavior modeling tool can comprise the creation of an XML file, in particular an AUTOSAR ARXML file. The AUTOSAR ARXML file can be an independent file or a part of a container file that contains additional data. XML is a widely used text-based format that can be processed quickly and efficiently. The exchange of architecture data between the architecture definition tool and the behavior modeling tool can mean the transfer from the architecture definition tool to the behavior modeling tool and/or the transfer from the behavior modeling tool to the architecture definition tool.

The behavior modeling tool can export or transfer architecture data in the form of an XML file, in particular an AUTOSAR ARXML file, wherein the ARXML file expediently comprises a section with variable data, i.e., data on variables, such as data type, scaling or range. In particular, variable data need not have been previously defined, but can be ascertained in the behavior modeling tool during code generation. Further data that can be added or changed in the behavior modeling tool may be the name of an interface port, the name of a runnable entity and/or the name of a parameter or of a global variable. In the AUTOSAR class model, a number of objects are defined, which in turn may have properties. Objects and properties can collectively be referred to as elements. In the ARXML file, there is a tree-shaped hierarchy, so that the respective properties in the next lower hierarchy level are assigned to an object.

A method for merging architecture data according to the invention comprises the steps of Opening a first file with first architecture data and a second file with second architecture data in a comparison tool, Comparing the first architecture data with the second architecture data, in order to obtain a first list of differences, Retrieving at least one combination rule, wherein a combination rule comprises an identification rule for identifying a difference and a change to be applied to the identified difference, Ascertaining a second list of differences that fulfill the identification rule, along with removing these differences from the first list, and Applying the change defined in the combination rule to each difference in the second list.

Advantageously, differences present in a first phase are ascertained, wherein an alignment of associated sections preferably also takes place; the ascertained differences are eliminated in steps during a second phase by applying combination rules. Differences once eliminated by a combination rule are expediently removed from the list of remaining differences. This ensures a stable execution behavior of the method; in particular, it cannot lead to an infinite loop. By first checking an identification rule before a change is applied, a combination rule can be tailored specifically for a specific class of differences. The list of differences can contain a number of objects or elements in which at least one property is different in the first architecture data than in the second architecture data, while one or more further properties match.

In a preferred embodiment, multiple combination rules are defined, wherein the combination rules are retrieved and executed in a predetermined sequence until all combination rules have been executed or the first list of differences is empty. A set of rules of multiple combination rules can be stored in a file that is predefined and/or can be edited by a user. This makes it possible to identically track a group of changes to an ARXML file at any later point in time and at the same time offers the user a high degree of flexibility.

If the first file and the second file are in ARXML format, at least one object of the first file or of the second file is preferably moved before differences are ascertained, in order to align associated objects with one another. It can also occur that the ARXML tree structure of the first file was divided into multiple partial files, which are merged prior to the comparison. In particular, objects that have the same short name may be associated objects or can be aligned with one another. Associated subregions of the ARXML tree structure may also be moved in one of the files.

If a first object references a second object, it can expediently be provided that the first object and the second object are changed in the same way. That is to say, if a difference comprising the first object is identified in the combination rule, the same change is applied to the second object. If a difference comprising the second object is identified in the combination rule, the same change is applied to the first object. It can also be provided that a reference is directed, that is to say a change in the first object is applied to the second object, but a change in the second object is not applied to the first object.

It is advantageous if identification rules may include multiple conditions. This enables a very selective change in the ARXML files using easily understood conditions. The conditions may be nested by logical operators, such as AND, and/or brackets. In particular, it can be provided that an identification rule identifies a difference only when all included conditions are fulfilled.

It is particularly advantageous if an identification rule includes a condition that checks whether a parameter is within a value range, wherein the value range is dynamically defined in a variable. Expediently, a first query takes place, which returns a value or a list of values, whereupon these values are temporarily stored in a variable. In the condition, the variable is used to compare the parameter with the stored values. The variable is preferably discarded immediately after evaluation of the including identification rule; errors or side effects can thereby be avoided.

The invention furthermore relates to a method for configuring a control device, wherein the control device comprises at least one computing unit and preferably has at least one sensor and/or at least one actuator for acquiring data of a physical process and/or acting on the latter, the method comprising the steps of a. Generating consolidated architecture data with a method for merging changes according to the invention,
b. Importing the consolidated architecture data into a behavior modeling tool,
c. Generating source code based on the behavior model,
d. Compiling the source code for the computing unit, so that an executable code is generated,
e. Transferring the executable code to the control device, and
f. Storing the executable code in a non-volatile memory of the control device and/or executing the executable code via the computing unit of the control device.

Furthermore, the invention relates to a computer program product with a computer-readable storage medium in which commands are embedded that, when executed by a processor, cause the processor to be configured to execute a method according to the invention for transferring changes.

The invention furthermore relates to a computer system comprising a human-machine interface, a non-volatile memory and a processor, wherein the processor is configured to execute a method according to the invention for transferring changes.

The present invention is elucidated in the detailed description given below and the accompanying drawings, which are given by way of illustration only and thus do not limit the present invention.

Figure 1:
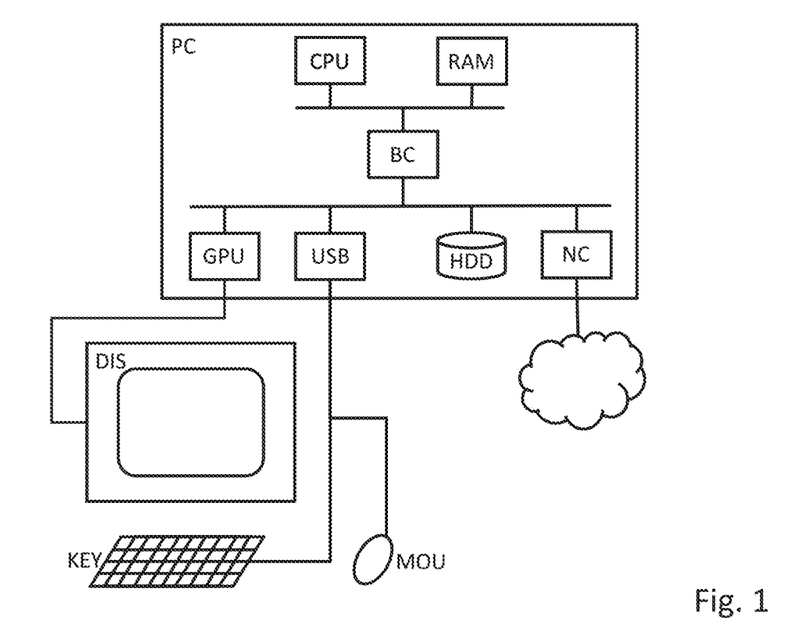
FIG. 1 is an exemplary diagram of a computer system.

FIG. 1 shows an exemplary embodiment of a computer system.

The embodiment shown comprises a host computer PC with a monitor DIS and input devices, such as a keyboard KEY and a mouse MOU.

The host computer PC comprises at least one processor CPU with one or more cores, a random access memory RAM and a number of devices connected to a local bus (such as PCI Express), which exchanges data with the CPU via a bus controller BC. The devices comprise, for example, a graphics processor GPU for controlling the display, a controller USB for connecting peripheral devices, a non-volatile memory, such as a hard disk or a solid state disk, and a network interface NC. The non-volatile memory can comprise instructions that, when executed by one or more cores of the processor CPU, cause the computer system to execute a method according to one of the claims.

In one embodiment of the invention indicated by a stylized cloud in the figure, the host computer can comprise one or more servers comprising one or more computing elements, such as processors or field programmable gate arrays (FPGAs), wherein the servers are connected via a network to a client comprising a display device and input device. The technical computer environment can thus be executed partially or completely on a remote server, for example in a cloud computing setup. As an alternative to a PC client, a graphical user interface of the technical computer environment can be displayed on a portable computer device, in particular a tablet or a smartphone.

Figure 2:
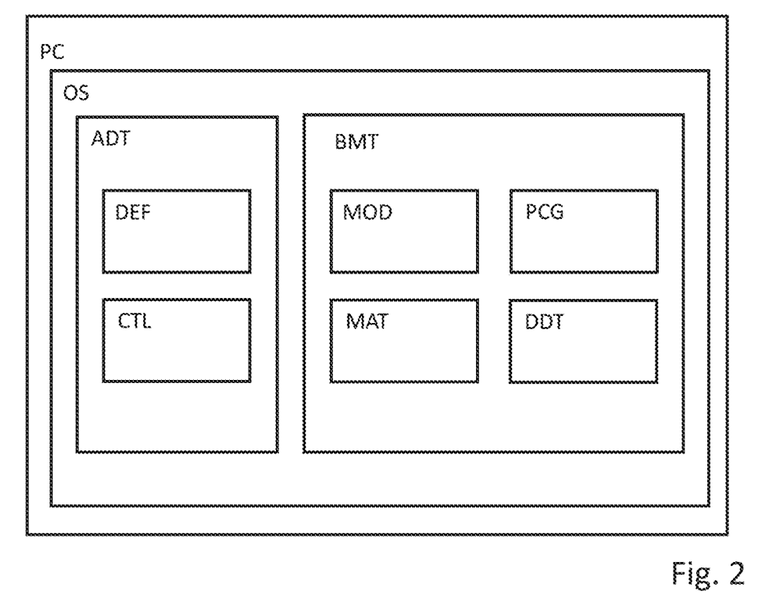
FIG. 2 is an exemplary diagram of software in a computer system.

FIG. 2 shows an exemplary embodiment of the software executed on the computer system, wherein a standard operating system, such as Microsoft Windows or a Linux distribution, can be executed on the host computer PC. An architecture definition tool ADT and a behavior modeling tool BMT are installed on the host computer PC.

The architecture definition tool ADT comprises a definition environment DEF. The definition environment DEF can comprise a graphical user interface for defining and changing the software architecture. In addition, it can comprise a user interface for defining a hardware architecture comprising one or more control devices, and/or a user interface for providing various elements of the software architecture in the control devices of the hardware architecture. Moreover, the architecture definition tool comprises a control tool CTL that can enable the importing and/or exporting of one or more elements of the software architecture, in particular of an entire software component definition, and the calculation of a checksum based on an XML file with the various elements.

The behavior modeling tool BMT can be based on a technical computing environment (such as MATLAB/Simulink by The MathWorks), which comprises multiple software components, such as a model editor MOD for displaying and changing block diagrams and/or a script interpreter MAT configured to perform calculations or change data. In addition, a simulation engine for executing block diagrams can be part of the BMT. The BMT comprises a production code generator PCG that is adapted to generate production code from a model; it furthermore comprises a data definition tool DDT. The expression that a software component is contained in the BMT is to include the case that the software component uses a particular mechanism of the BMT, for example an application programming interface, in order to exchange data and/or instructions with other software components in the BMT. For example, a software component can be realized as an add-on, such as a toolbox or a block library for the model editor MOD, or comprise it.

The model editor MOD can provide a graphical user interface for creating and changing block diagrams that can describe the temporal behavior of a dynamic system. In addition, blocks adapted to describe finite states and conditions for transitions between states can be used to model the dynamic system. A block can describe an atomic operation, such as an arithmetic calculation or a logical expression, or it can represent a subsystem that is described in more detail by an additional or partial block diagram in a subordinate hierarchy level. This does not have to mean that the partial block diagram is stored in a separate file, but that the functionality of a hierarchical block is defined by multiple blocks at a subordinate level. Alternatively, it can contain code in a superordinate programming language, in particular in a dynamic language, which is provided for mathematical programming and realizes the functionality of the block. Multiple blocks may be connected by signals for data exchange. For example, a beginning block can receive a signal of the type Single as an input signal, modify the signal, e.g., by adding a constant, and can transmit an output signal of the type Double to a further block. The further block could be regarded as downstream of the beginning block, since the blocks are connected by a signal path, so that data flow from the beginning block to the further block.

The production code generator PCG enables production code to be created from one or more blocks in a block diagram. The production code can be optimized with regard to readability, traceability, safety, low energy consumption, execution speed and/or memory requirements. The code generator can provide a user interface for defining a plurality of options for adjusting the adaptation of the generated code. The adaptation options may include target-specific optimizations for the microcontroller of the embedded system and the enforcement of the conformity of the generated code with a particular standard, such as the MISRA C guidelines. For example, TargetLink by dSPACE comprises a production code generator PCG.

The data definition tool DDT offers a local or remote database for storing definitions and parameters, along with an application programming interface for automatic data exchange between various software components. The term "database" can be understood in the broader sense, so that a file with a tree structure can be considered as a local database. A data definition tool enables clean separation of the model of the dynamic system specified in the block diagram from the implementation-specific details stored in the database. If a complex model, in particular a large software component, is structured in various submodels, in particular various subcomponents, data can be linked in various submodels. By storing corresponding data in the data definition tool, these dependencies can be resolved automatically. Through the data exchange with the architecture definition tool, the data definition tool DDT can also be used as part of a superordinate tool chain, in order to generate product code that corresponds to the AUTOSAR standard, for example. A data definition tool can be TargetLink DataDictionary by dSPACE.

Other software components, such as a production code compiler PCC, may be installed on the computer. These software components can be connected to one another and/or to the technical computer environment using standard mechanisms of the underlying operating system. The compiler PCO can generate an executable file for the microprocessor of the PC, it can generate an object code for the microcontroller of the embedded system or it can synthesize a bit stream for configuring a programmable logic module.

Figure 3:
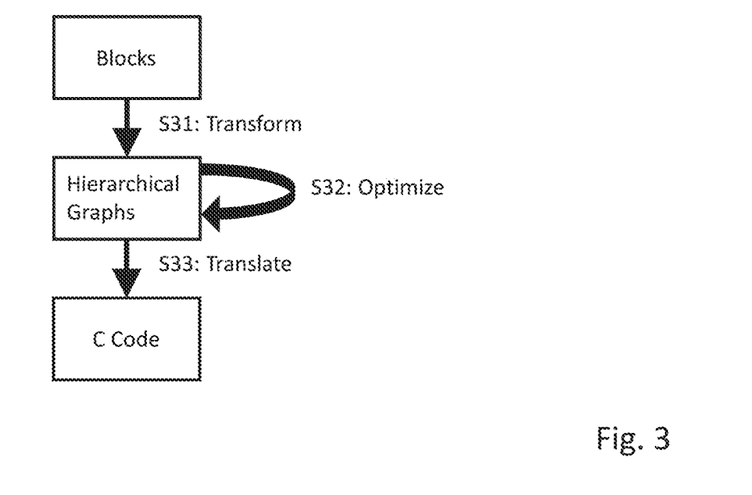
FIG. 3 is an exemplary diagram of a method for generating production code from a functional model.

FIG. 3 shows an exemplary embodiment of the generation of production code from one or more blocks of a functional model (block diagram), wherein the following steps may be executed by one or more microprocessors on the host computer.

In a first step S31 (Transform), the selected one or more blocks (or, if selected, the entire block diagram) and the associated input data are transformed into an intermediate representation, such as one or more hierarchical graphs. These hierarchical graphs may, in particular, comprise a data flow graph, a control flow graph and/or a tree structure. Related input data can be extracted, for example, from a database assigned to the block diagram. This can include situations in which elements of the block diagram are created based on data from a data definition tool or in which settings that are relevant to the creation of the production code are retrieved from the data definition tool.

In a second step S32 (Optimize), the hierarchical graphs are optimized in order to reduce the number of variables required and/or the number of operations or instructions to be executed. This optimization can include multiple intermediate steps for further intermediate representations between the block level and the production code level. In each step, an initial set of hierarchical graphs or an intermediate language is converted into a modified set of hierarchical graphs or an intermediate language, while one or more optimization rules are applied. During optimization, a number of strategies can be applied, e.g., constant folding or dead code elimination.

In a third step S33 (Translate), the optimized intermediate representations, such as optimized hierarchical graphs, are translated into code in a higher programming language, for example C code. The code can be further optimized in this step and limited to a subset of the linear or parallel programming language; the control and data flow structures may be limited to precisely specified variants; the functional scope and the data may be limited according to precisely specified rules. Alternatively or additionally, further data may be added to the code, for example in the form of comments, in order to improve readability or to aid in debugging the code.

During or after code generation, data regarding the current block diagram or the code generation, in particular results of the code generation, can be stored again in the data definition tool. These data can be used, for example, to initialize the simulation engine, to influence a compilation process with a production code compiler or to export production code data for use in other tools/processes, such as calibration and measurement data in the ASAP2 format or AUTOSAR XML data.

In alternative embodiments, code at the hardware level or a configuration for a programmable hardware device can be generated from the blocks describing the control program.

Figure 4:
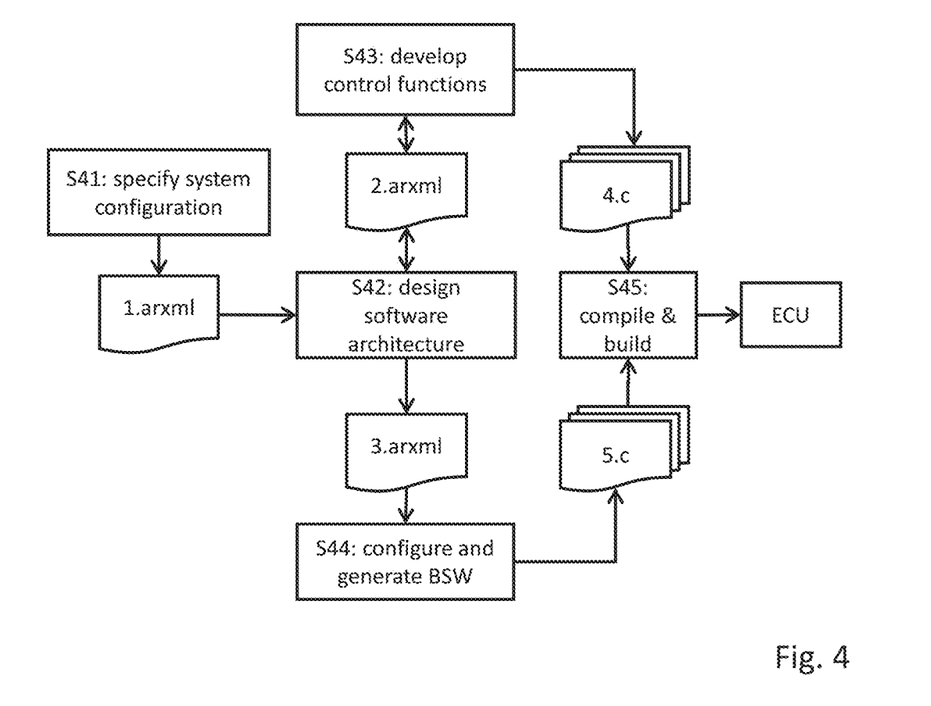
FIG. 4 is an exemplary diagram of a method for generating the firmware of a control device.

FIG. 4 shows an exemplary diagram of a method for creating the firmware of a control device.

In step S41 (Specify system configuration), the hardware for executing the control program(s) is specified. While the system configuration can in principle comprise multiple control devices, the exemplary system described here can comprise, for the sake of simplicity, only one control device (electronic control unit (ECU)) on which one or more software components are executed. If a different tool is used for defining the system configuration than for defining the software architecture, the system configuration is exported by creating an ARXML file (1.arxml). In particular for an integrated architecture definition tool, system data and software data may be stored in a dedicated database or in a proprietary file format.

In step S42 (Design software architecture), the software architecture of the software component is defined in the architecture definition tool ADT. The software architecture is exported by creating an ARXML file (2.arxml). A development process can comprise multiple repetitions of steps S42 and S43, which are also referred to as round trips. If the software architecture is defined and the behavior is modeled, the software architecture is exported into an ARXML file (3.arxml), in order to create basic software of the ECU. This file can comprise one or more sections that differ from those in the file generated in step S41 and contain, for example, specification data of a microcontroller of the ECU.

In step S43 (Develop control functions), the defined architecture of a software component is imported into the behavior modeling tool BMT and a functionality of the software component is edited in a graphical model editor; before manual modeling, a framework model can be generated automatically based on the imported architecture data. The ARXML file comprises multiple sections. One section defines the interface of the software component, which can comprise input and output ports for receiving and transmitting signals, global variables, along with transmitter and receiver interfaces. One section of the ARXML file relates to the implementation, i.e., the source code files generated by the behavior modeling tool BMT; this section is initially empty and is added if an ARXML file of the software architecture is imported again from the behavior modeling tool. A simplified diagram of an ARXML file is shown below in Listing 1.

In step S44 (Configure and generate BSW), a basic software (BSW) that provides functions and interfaces for the software component is configured. The basic software is adapted to the specific ECU hardware and can be considered as a customized operating system for the ECU. In addition, a runtime environment can be created as middleware between basic software and software component. The runtime environment can provide messaging services for data exchange between various software components or runnable entities. The basic software can be created by the architecture definition tool or by a dedicated basic software generator.

In step S45 (Compile and build), the source code files (4.c) of the software component and the source code files (5.c) of the basic software are compiled and linked by a (cross) compiler adapted to the target hardware platform (the processor/microcontroller of the control device), in order to create an executable binary file. The binary executable file can be written to a non-volatile memory of the electronic control unit (ECU).

The following Listing 1 shows the general format of an ARXIVIL file.

Figure 5:
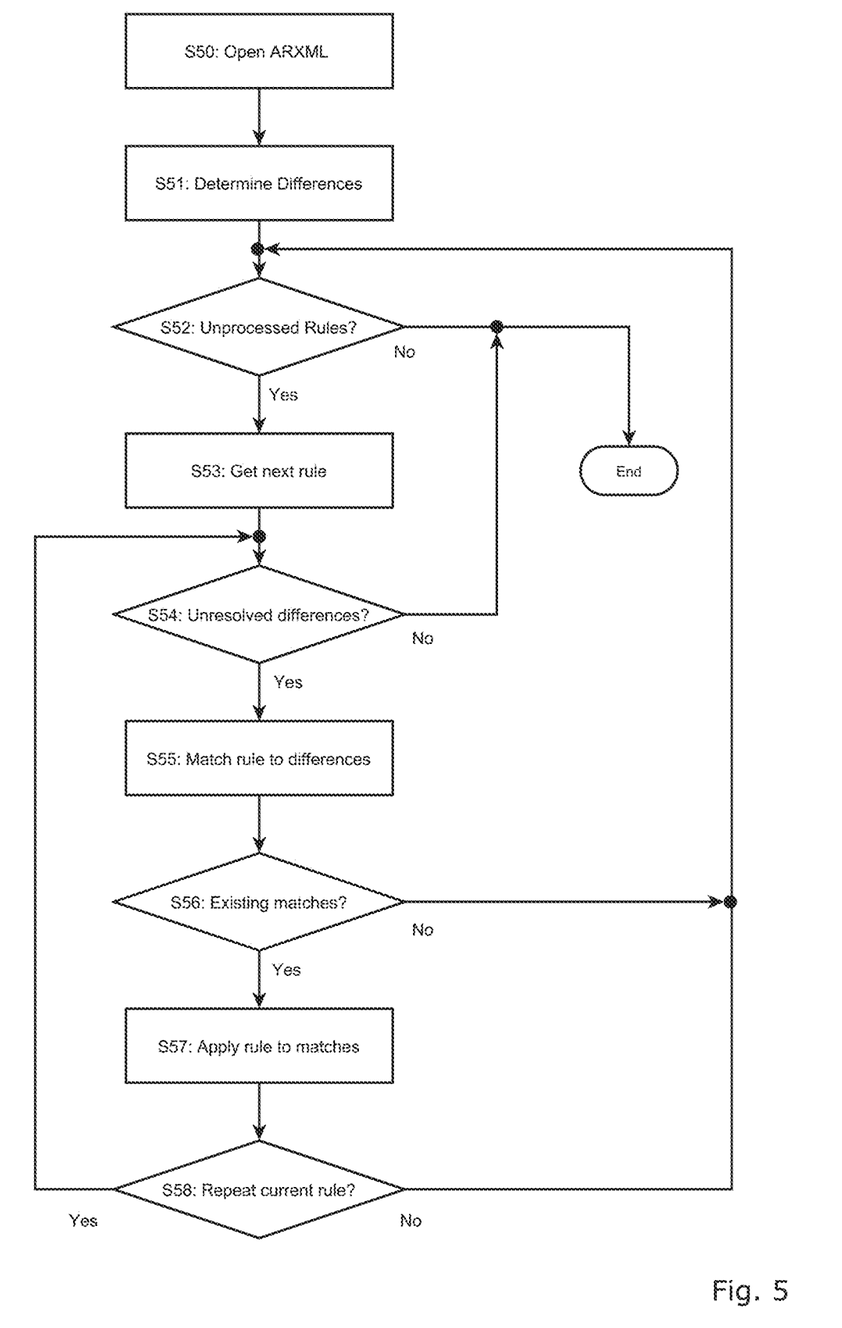
FIG. 5 is a schematic diagram of a method for merging ARXML files.

On the basis of the comparison of the two files, a list of differences is created in step S51 (Determine differences). For example, a difference can be that an element is present in a first file and is absent in a second ARXML file. Then, the difference can either be solved by deleting the element in both files or by adding the element to the second file. This can be done, for example, on the basis of a combination rule that checks an identification rule or the presence of a condition and in this case applies a predetermined change. A list of combination rules with various identification rules and various changes can be applied successively to the present list of differences.

Therefore, in step S52 (Unprocessed rules?), there is first a check of whether any combination rules still to be applied are present. If not (No), the method is terminated (End). Otherwise (Yes), the next combination rule to be applied is read from the list in step S53 (Get next rule).

In step S54 (Unresolved differences?), there is a subsequent check of whether there are any differences still to be resolved or whether the present list is empty. If no differences remain (No), i.e., the list is empty, the method is terminated (End). Otherwise (Yes), the combination rule is applied to the remaining differences in step S55 (Match rule to differences), wherein there is first a check of whether the identification rule is fulfilled.

Listing 1:

```
<AUTOSAR ...>
<AR-PACKAGES>
    <AR-PACKAGE>
        <SHORT-NAME>Name1</SHORT-NAME>
        <ELEMENTS>
            <APPLICATION-SW-COMPONENT-TYPE>
                <SHORT-NAME>SWC</SHORT-NAME>
                <PORTS>
                    <R-PORT-PROTOTYPE>
                        <SHORT-NAME>RP2</SHORT-NAME>
                    </R-PORT-PROTOTYPE>
                </PORTS>
                <INTERNAL-BEHAVIORS>
                    <SWC-INTERNAL-BEHAVIOR>
                        <SHORT-NAME>Name4</SHORT-NAME>
                        <RUNNABLES>
                            <RUNNABLE-ENTITY>
                                <SHORT-NAME>RUN1</SHORT-NAME>
                            </RUNNABLE-ENTITY>
                            <RUNNABLE-ENTITY>
                                <SHORT-NAME>RUN2</SHORT-NAME>
                            </RUNNABLE-ENTITY>
                        </RUNNABLES>
                    </SWC-INTERNAL-BEHAVIOR>
                </INTERNAL-BEHAVIORS>
            </APPLICATION-SW-COMPONENT-TYPE>
        </ELEMENTS>
    </AR-PACKAGE>
</AR-PACKAGES>
</AUTOSAR>
```

If source code is generated, an implementation section in the ARXML file must be added or updated, as described above in connection with FIG. 4. The implementation section can contain the names and paths to the various code files.

FIG. 5 shows a schematic diagram of a method for merging ARXML files.

In step S50 (Open ARXML), the two ARXML files to be compared are opened. In principle, the data could also be distributed among multiple ARXML files, which are first each assembled into a tree in correspondence with the AUTOSAR model.

The user can select which differences are to be treated via identification rules, which are also referred to below as queries. If a query is executed, it returns a number of differences (one, multiple or none). In this case, a query can consist of a single condition or a logical link of multiple conditions. Conditions are evaluated and provide a yes/no statement. Queries can be nested by one condition requiring the fulfillment of a further query. For this purpose, queries can be created both locally and globally, wherein global queries can be used as conditions in other queries.

Conditions can test both properties and the environment of objects/differences. Moreover, conditions that examine the environment of objects/differences can test further conditions from there without losing the focus on the actual object.

Conditions can be divided into three categories:
1. Object conditions, which examine the properties of an object (difference or AUTOSAR object),
2. Navigation conditions, which examine the environment of an object, and
3. Meta conditions, which nest other conditions.

Object conditions make it possible to query properties of an object (in particular a difference or an AUTOSAR object). For example, a user can specify valid values as a list of strings. Preferably, he can additionally specify whether this list is to be interpreted as a whitelist or blacklist. Permissible values can be specified with a whitelist, while a blacklist specifies prohibited values. Preferably, the user can also specify regular expressions as strings, which are then interpreted.

Examples of object conditions:
HasValue
IsType
IsRole
IsOrphan
IsMinor
IsReferenceProperty
IsSplitable An object that is present on one side but to which no object has been assigned on the other side can be referred to as an orphan.

Navigation conditions make it possible to examine the environment of an object. In this case, navigation can take place along the typical XPath axes (ancestors, descendants, siblings) in the tree, i.e., for example, to an adjacent leaf (descendant). Moreover, navigation can take place along AUTOSAR reference properties (in both directions).

A subcondition that must be fulfilled by the respective target ("Where") can additionally be specified for a navigation condition. If there are multiple possible targets for a navigation condition, a subcondition is checked for all targets until there is a match, i.e., an element that additionally also fulfills the subcondition.

For navigation queries returning more than one valid target, a limitation on how many valid results are found at most can be specified.

Examples of navigation conditions:
HasChild
HasDescendant
HasSibling
HasParent
HasAncestor
HasTarget
HasReferencePropertyWithTarget
IsReferencedFromProperty
IsReferencedFromObject
IsRequiredByObject
RequiresObject Meta conditions make it possible to nest other conditions or link them to one another. On the one hand, this represents Boolean logic; on the other hand, it can thus be set whether AUTOSAR object-related conditions must/may be fulfilled on both sides or only one side.

Examples of meta conditions:
And
Or
Xor
Not
Subquery
EitherSide
ExactlyOneSide
SameSide
OtherSide
BothSides
OnlyLeft
OnlyRight In step S56 (Existing matches?), there is a check of whether the identification rule matched at least one object or whether the condition(s) were fulfilled for at least one object. If not (No), the execution is continued in step S52 (Unprocessed rules?) and the next combination rule is thus applied or its identification rule checked.

In the case of matching objects (Yes), the changes defined in the combination rule are applied to these objects in step S57 (Apply rule to matches).

The following types of changes can be applied:
CopyLeft/Right
CopyOrphan
DeleteOrphan
CopyToSelected
CopyFromSelected
CopyToLabel
CopyFromLabel
Ignore/Accept Difference
RepeatPreviousSolution
ReportUnsolved
ReportCritical
CallCustomScript—in order to call an external script Copy changes defined the copying of objects or elements; the latter can be applied with subordinate elements or children (Deep) or limited to the specific element (SingleObject). It can also be provided that all children who are not identifiable themselves can additionally be copied for an identifiable object in AUTOSAR. The user can specify further rules for children that are identifiable objects themselves. In order to be able to apply a CopyTo/FromSelected and RepeatPreviousSolution, the preceding identification rule must have selected one side (i.e., ExactlyOneSide query) or examined a difference already resolved (HasResolvedDifference query).

The user can specify the number and sequence of combination rules to be applied, wherein the latter can also be executed multiple times in succession. This takes into account the possibility that the one-time application of a combination rule resolves a difference and thereby changes the boundary conditions of other differences, so that the identification rule would now match them. In step S58 (Repeat current rule?), there is a check of whether a repeated application of the current combination rule is desired. If yes (Yes), the execution is continued in step S54, i.e., the combination rule is applied to the remaining differences. If no (No), the next combination rule to be applied is retrieved in step S52 (Unprocessed rules).

Figure 6:
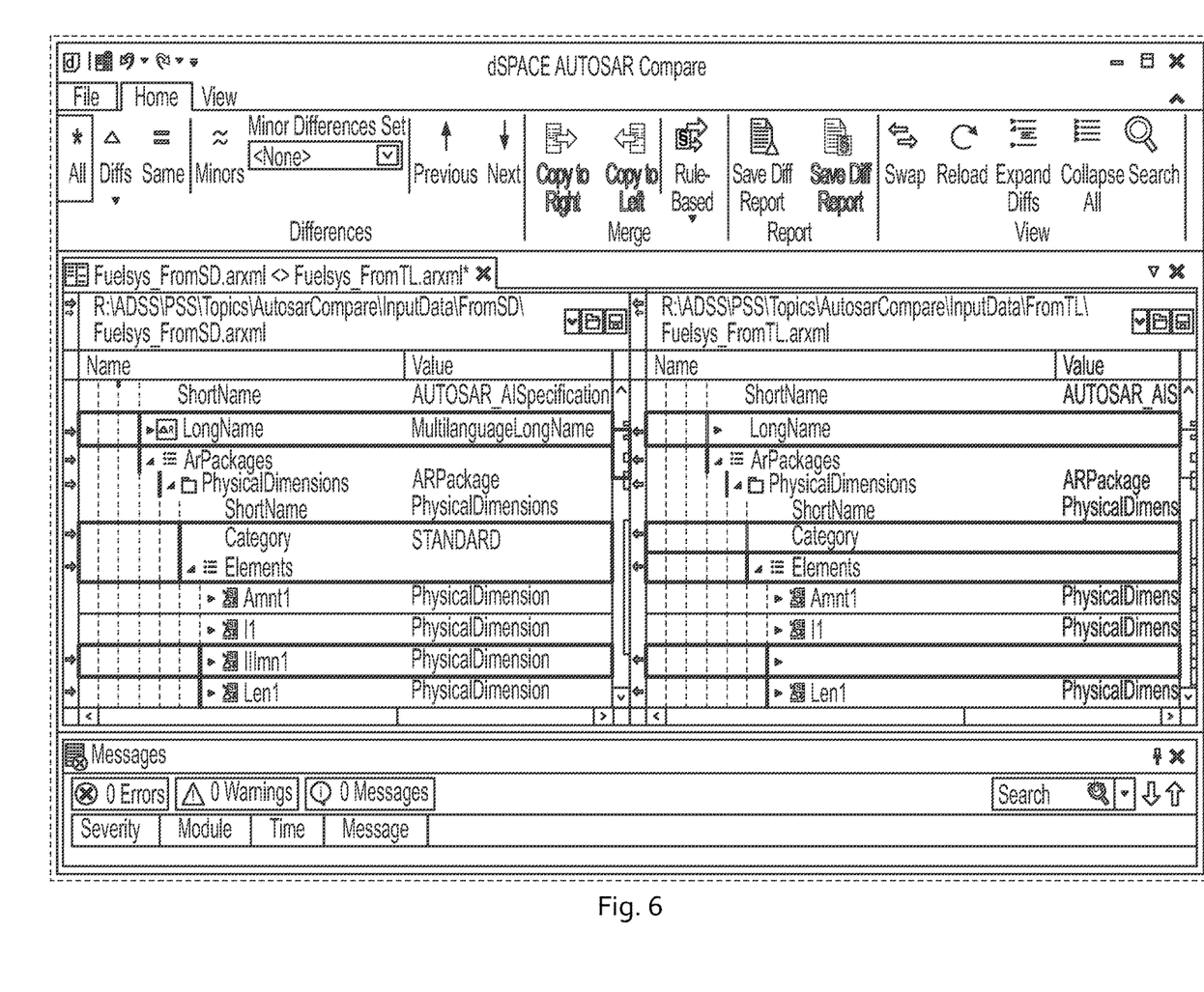
FIG. 6 is an exemplary representation of a graphical user interface with a representation of the differences of two ARXML files.

FIG. 6 shows an exemplary embodiment of a graphical user interface with a representation of the differences of two ARXML files. Two adjacent trees that represent the elements contained in the ARXML files to be merged are shown in a central window. Differences are emphasized, for example, by showing in color and/or highlighting an element present only on one side or the value thereof, while the element is shaded in gray or shown as a blank line on the other side. A user can enter combination rules in the form of a text file or create them interactively via a graphical editing tool.

Figure 7:
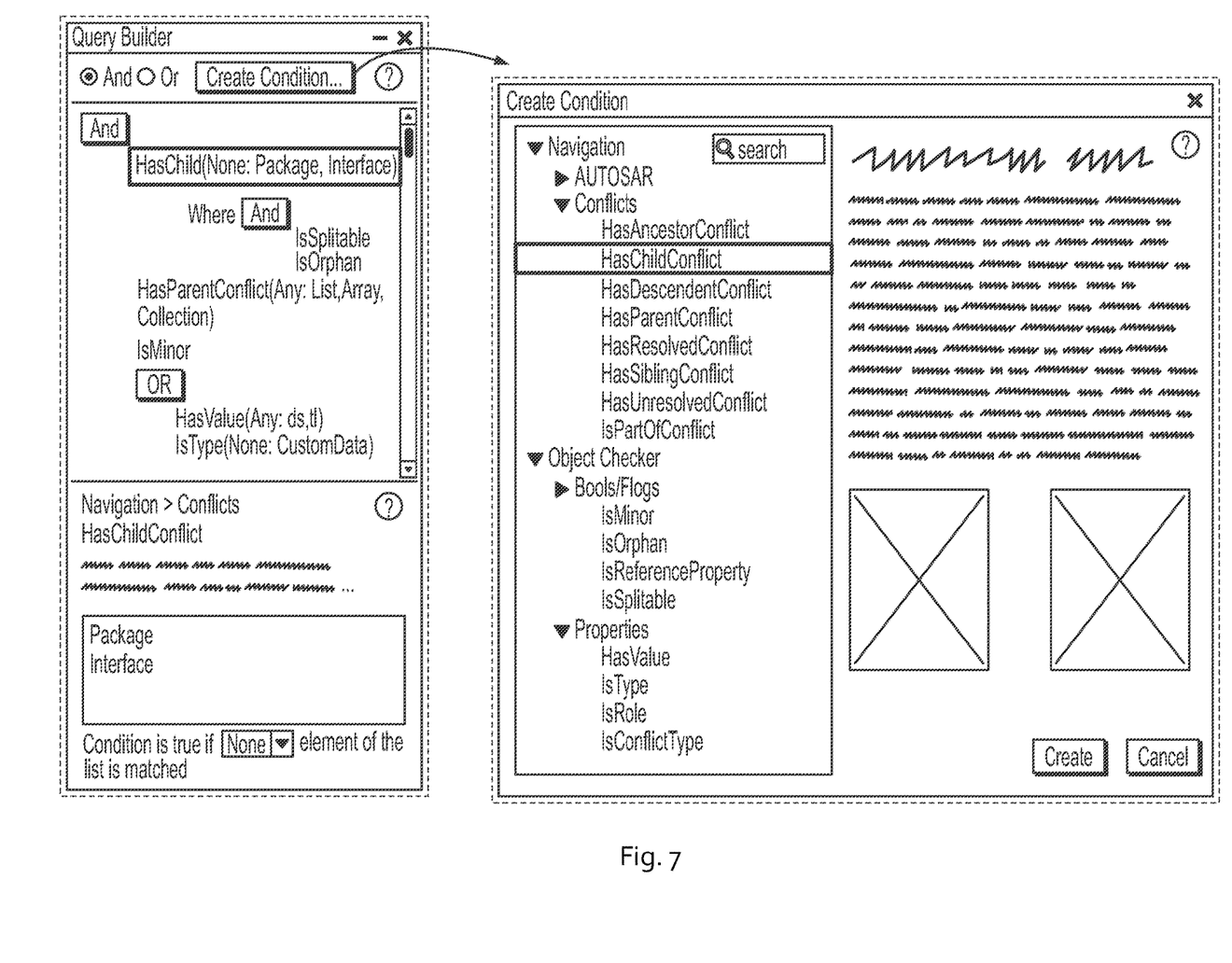
FIG. 7 is an exemplary representation of a graphical user interface for creating identification rules with a dialog for defining a new condition.

FIG. 7 shows an exemplary embodiment of a graphical editing tool for creating identification rules with a dialog for defining a new condition. The logical structure of conditions is shown in a first window (Query Builder) in the form of a tree structure. Via a button (Create Condition), the user can open a dialog for inserting a new condition. The desired condition or subquery can be selected from a hierarchically organized list. If the condition comprises an adaptable value, the user can make a specification via a further window.

According to one embodiment of the invention, a predefined set of rules is provided, which remedies the differences occurring in a round trip between an architecture definition tool and a behavior modeling tool. Some potentially occurring differences and exemplary combination rules for their resolution are shown below as pseudocode.

Within an interface definition, a list of invalidation policies can occur, within which the sequences of elements have changed. This can be treated via the combination rule specified in Listing 2. Alternatively, it can also be provided to already recognize or resolve differences in the sequence occurring when reading the ARXML files.

Listing 2:
HasType(InvalidationPolicy)
and HasChildWithType(DataElementRef) where HasValue (*, capture as "RefValue")
and HasMatch( ) where HasSibling( ) where HasChildWithType(DataElementRef) where Has Value($RefValue$)

In the pseudocode, a capture instruction that serves to dynamically adapt a valid value range is used. For a subquery that returns a value as a string, a list of values obtained can be stored under a specified name or in a variable. This list can then be used at a later point in a combined query or identification rule. It is preferably provided that the list remains valid only within a single combined query, in order to avoid errors or side effects. Two targets of a navigation query can be compared via a capture instruction; for example, an implicit and an explicit InterRunnable variable (IRV) can be compared with one another within an InternalBehavior section of the ARXIVIL file, even though they are arranged in different subareas or subelements of the internal behavior. This is done by first storing the value of a variable, e.g., the implicit IRV, in a capture instruction and subsequently comparing the value of the second variable, e.g., the explicit IRV, with the stored value.

The pseudocode shown in Listing 2 uses the series HasMatch( ) where HasSibling( ), in order to find an element on the other side of the comparison at another location of the list. This query can be used to adopt the list of the side that has unique objects or to generate a critical error if objects on both sides are in the list that are missing on the other side.

If an older architecture definition file is imported by a behavior modeling tool, it can happen as a difference that a data type of the category VALUE with a BaseType reference occurs within an ImplementationDataType element on one side, while on the other side, the category TYPE REFERENCE occurs in conjunction with an ImplementationDataType reference. Listing 3 shows pseudocode for recognizing this difference occurring between different AUTOSAR versions, so that it can be eliminated with a change on the desired side.

Listing 3:
HasType(ImplementationDataType)
and ExactlyOneSide HasChildWithRole(Category) where HasValue(VALUE)
and SameSide HasDescendantWithRole(BaseTypeRef) where
HasValue(/BaseTypeGeneric/*)
and OtherSide HasChildWithRole(Category) where HasValue(TYPE REFERENCE)
and OtherSide HasDescendantWithRole(ImplementationDataTypeRef) where
HasValue(/AUTOSAR_Platform/ImplementationDataTypes/*)

The method according to an exemplary embodiment of the invention enables a flexible merging of two ARXML files, wherein the clean separation of the finding of the differences from the resolution ensures a stable execution behavior and a reproducible result.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for merging architecture data that are exchanged between an architecture definition tool and a behavior modeling tool, wherein the architecture definition tool is configured to define an architecture of a software component, wherein the architecture data comprises objects, wherein the behavior modeling tool is configured to generate source code for at least one subcomponent of the software component based on a functional model, wherein the functional model comprises multiple interconnected blocks, and wherein the architecture definition tool and the behavior modeling tool are each configured to import and/or export the architecture data, the method comprising:

opening a first file with first architecture data and a second file with second architecture data in a comparison tool;

comparing the first architecture data with the second architecture data to obtain a first list of differences;

retrieving at least one combination rule, wherein the at least one combination rule comprises at least one identification rule for identifying a difference and a change to be applied to the identified difference;

ascertaining a second list of differences that fulfill the at least one identification rule and removing the differences of the second list from the first list; and applying the change defined in the at least one combination rule to each difference in the second list;

wherein one or more identification rules of the at least one combination rule comprise multiple nested conditions linked with logical operators, wherein all conditions of a respective identification rule of the one or more identification rules must be fulfilled for a respective difference to fulfill the respective identification rule.

2. The method according to claim 1, wherein a plurality of combination rules are defined, wherein the plurality of combination rules are retrieved and executed in a predetermined sequence until all combination rules have been executed or the first list of differences is empty.

3. The method according to claim 1, wherein the first file and the second file are in ARXML format, and at least one object of the first file or of the second file is moved before identifying differences to align associated objects with one another, wherein objects that have the same short name are associated objects.

4. The method according to claim 1, wherein a first object references a second object; and
wherein:
a difference comprising the first object is identified in the at least one combination rule, wherein the same change is applied to the second object; or
a difference comprising the second object is identified in the at least one combination rule, wherein the same change is applied to the first object.

5. The method according to claim 1, wherein a first condition checks a property of an object and a second condition checks an environment of the object.

6. The method according to claim 1, wherein the at least one identification rule comprises a condition that checks whether a parameter is within a value range, wherein the value range is dynamically defined in a variable.

7. The method according to claim 6, further comprising:
a. generating consolidated architecture data based on applying the change defined in the at least one combination rule to each difference in the second list;
b. importing the consolidated architecture data into the behavior modeling tool;
c. generating the source code based on the behavior modelling tool;
d. compiling the source code for a computing unit of a control device to generate an executable code;
e. transferring the executable code to the control device; and
f. storing the executable code in a non-volatile memory of the control device and/or executing the executable code via the computing unit of the control device.

8. A non-transitory computer-readable medium having processor-executable instructions stored thereon for merging architecture data that are exchanged between an architecture definition tool and a behavior modeling tool, wherein the architecture definition tool is configured to define an architecture of a software component, wherein the architecture data comprises objects, wherein the behavior modeling tool is configured to generate source code for at least one subcomponent of the software component based on a functional model, wherein the functional model comprises multiple interconnected blocks, wherein the architecture definition tool and the behavior modeling tool are each configured to import and/or export the architecture data, and wherein the processor-executable instructions, when executed, facilitate performance of the following:
opening a first file with first architecture data and a second file with second architecture data in a comparison tool;
comparing the first architecture data with the second architecture data to obtain a first list of differences;
retrieving at least one combination rule, wherein the at least one combination rule comprises at least one identification rule for identifying a difference and a change to be applied to the identified difference;
ascertaining a second list of differences that fulfill the at least one identification rule and removing the differences of the second list from the first list; and
applying the change defined in the at least one combination rule to each difference in the second list;
wherein one or more identification rules of the at least one combination rule comprise multiple nested conditions linked with logical operators, wherein all conditions of a respective identification rule of the one or more identification rules must be fulfilled for a respective difference to fulfill the respective identification rule.

9. A computer system comprising a processor and a non-transitory memory having processor-executable instructions stored thereon for merging architecture data that are exchanged between an architecture definition tool and a behavior modeling tool, wherein the architecture definition tool is configured to define an architecture of a software component, wherein the architecture data comprises objects, wherein the behavior modeling tool is configured to generate source code for at least one subcomponent of the software component based on a functional model, wherein the functional model comprises multiple interconnected blocks, wherein the architecture definition tool and the behavior modeling tool are each configured to import and/or export the architecture data, and wherein the processor is configured to execute the processor-executable instructions stored in the non-transitory memory to facilitate the following being performed by the computer system:
opening a first file with first architecture data and a second file with second architecture data in a comparison tool;
comparing the first architecture data with the second architecture data to obtain a first list of differences;
retrieving at least one combination rule, wherein the at least one combination rule comprises at least one identification rule for identifying a difference and a change to be applied to the identified difference;
ascertaining a second list of differences that fulfill the at least one identification rule and removing the differences of the second list from the first list; and
applying the change defined in the at least one combination rule to each difference in the second list;
wherein one or more identification rules of the at least one combination rule comprise multiple nested conditions linked with logical operators, wherein all conditions of a respective identification rule of the one or more identification rules must be fulfilled for a respective difference to fulfill the respective identification rule.

* * * * *